United States Patent Office 3,308,162
Patented Mar. 7, 1967

3,308,162
POLYBENZOYL POLY-(2-PROPYNYLOXY) BENZENE
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,691
2 Claims. (Cl. 260—591)

The present invention is directed to a compound corresponding to the formula

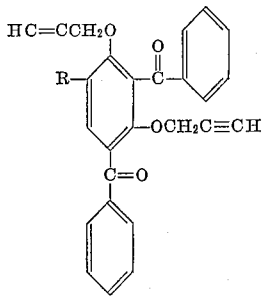

In this and succeeding formulae, R represents hydrogen or benzoyl. These compounds are dark liquids which are somewhat soluble in many organic solvents and of low solubility in water. The compounds have been found to be useful as pesticides for the control of various insect, worm, bacterial, and fungal organisms such as roundworms, beetles, roaches, and blight.

The new compounds can be prepared by reacting 2,4-dibenzoyl or 2,4,6-tribenzoyl resorcinol with a propargyl halide. The reaction is carried out in the presence of a basic material such as an alkali metal carbonate and preferably in a liquid reaction media such as isopropanol, acetone, or methyl ethyl ketone. The reaction takes place smoothly at temperatures at which halide of reaction is produced and preferably at temperatures of from 0 to 100° C. The halide of reaction appears in the reaction mixture as a salt of the metal cation from the employed base. Good results are obtained when employing one molecular proportion of the resorcinol reagent with greater than one molecular proportion, and preferably an excess, of each of propargyl halide and basic material. The reaction consumes the reactants in the proportion of two moles each of the propargyl halide and the basic material for every mole of 2,4-dibenzoyl or 2,4,6-tribenzoyl resorcinol and the use of the reactants in amounts which represent such proportions is preferred when optimum yields are desired. Upon completion of the reaction the desired product can be separated and purified by conventional procedures.

In carrying out the reaction, the propargyl halide, such as the chloride or the bromide, the di- or tri-benzoyl resorcinol and basic material can be combined in any convenient fashion. However, it is preferable to disperse the reactants in a liquid medium. Following the contacting, the reaction mixture is maintained at the contacting temperatures for a period of time to insure completion of the reaction. The reaction mixture can be filtered to remove the halide of reaction and the filtrate used in pesticidal compositions or the filtrate can be further purified by conventional procedures. In a convenient procedure, the hot reaction mixture is combined with aqueous alkali metal hydroxide and heated for a short period. The alkali metal hydroxide converts any unreacted starting materials to water soluble salts which can then be removed by washing the reaction mixture with water. The organic layer, obtained during the washing procedure, can be further purified by drying with a deliquescent material and by heating the dried material to remove the low boiling constituents.

The following examples illustrate the invention but are not to be construed as limiting.

*Example 1.—1,3-dibenzoyl-2,4-bis(2-propynyloxy) benzene*

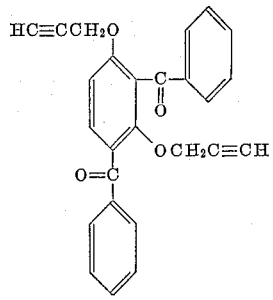

2,4-dibenzoyl resorcinol (53 grams), propargyl bromide (50 grams) and potassium carbonate (60 grams) were dispersed in 300 milliliters of acetone. The resulting mixture was heated with stirring at the boiling point and under reflux for forty hours. The reaction mixture was filtered while hot and the filtrate heated to remove the low boiling constituents. The 1,3-dibenzoyl-2,4-bis-(2-propynyloxy)benzene product was obtained as a liquid residue having a refractive index n/D of 1.5900 at 25° C.

*Example 2.—1,3,5-tribenzoyl-2,4-bis(2-propynyloxy) benzene*

2,4,6-tribenzoyl resorcinol (25 grams), propargyl bromide (20 grams) and potassium carbonate (21 grams) were dispersed in 200 milliliters of acetone. The resulting mixture was heated with stirring at the boiling temperature and under reflux for twenty-four hours. The heated reaction mixture was then combined with 30 milliliters of an aqueous solution 33 percent sodium hydroxide and the mixture heated for a short period. The reaction mixture was filtered to remove the halide of reaction, and the filtrate was heated to remove the low boiling constituents. As a result of these operations, there was obtained the 1,3,5-tribenzoyl-2,4-bis(2-propynyloxy)benzene product as a liquid residue. This residue was found to have a refractive index n/D of 1.5855 at 25° C.

The novel products of the present invention are useful as pesticides for the control of the growth and killing of many plant and animal species. For such uses, the products are dispersed on an inert finely divided solid and employed as dusts. Such mixtures also may be dispersed in water with or without the aid of a surface active agent, and the resulting aqueous suspension employed as sprays. In other procedures, the products are employed as active constituents in solvent solutions, oil-in-water or water-in-oil emulsions, or aqueous dispersions. In representative operations, aqueous compositions containing 1,3-dibenzoyl-2,4-bis-(2-propynyloxy)benzene at concentrations of 10 parts per million by weight give substantially complete kills of fire blight.

We claim:
1. 1,3-dibenzoyl-2,4-bis(2-propynyloxy)benzene.
2. 1,3,5-tribenzoyl-2,4-bis(2-propynyloxy)benzene.

References Cited by the Examiner
UNITED STATES PATENTS
2,900,361    8/1959    Havens _____ 260—591

LEON ZITVER, *Primary Examiner.*
D. D. HORWITZ, *Assistant Examiner.*